United States Patent [19]

Mann, Jr.

[11] 4,018,213
[45] Apr. 19, 1977

[54] SOLAR HEATING STRUCTURE

[76] Inventor: Harold J. Mann, Jr., 2120 Primrose, Fort Worth, Tex. 76111

[22] Filed: Apr. 5, 1976

[21] Appl. No.: 673,611

[52] U.S. Cl. .................................. 126/271; 47/17
[51] Int. Cl.² ............................................ F24J 3/02
[58] Field of Search .............. 47/17; 126/270, 271; 237/1 A

[56] References Cited

UNITED STATES PATENTS

| 3,080,875 | 3/1963 | Bartlett | 47/17 X |
| 3,450,192 | 6/1969 | Hay | 237/1 A |
| 3,807,088 | 4/1974 | Jones | 47/17 X |
| 3,910,490 | 10/1975 | Saypalia, Jr. | 126/271 |
| 3,949,732 | 4/1976 | Reines | 126/271 |

Primary Examiner—Kenneth W. Sprague
Attorney, Agent, or Firm—Arthur F. Zobal

[57] ABSTRACT

A greenhouse or the like comprising a frame formed from water carrying conduits which support panels capable of transmitting heat and light from the sun whereby radiant energy from the sun will pass through the panels and heat the space inside the house as well as the water in the conduits. The heated water in the conduits may be used to heat the greenhouse at night or as a supplementary system for a conventional home water heater.

11 Claims, 12 Drawing Figures

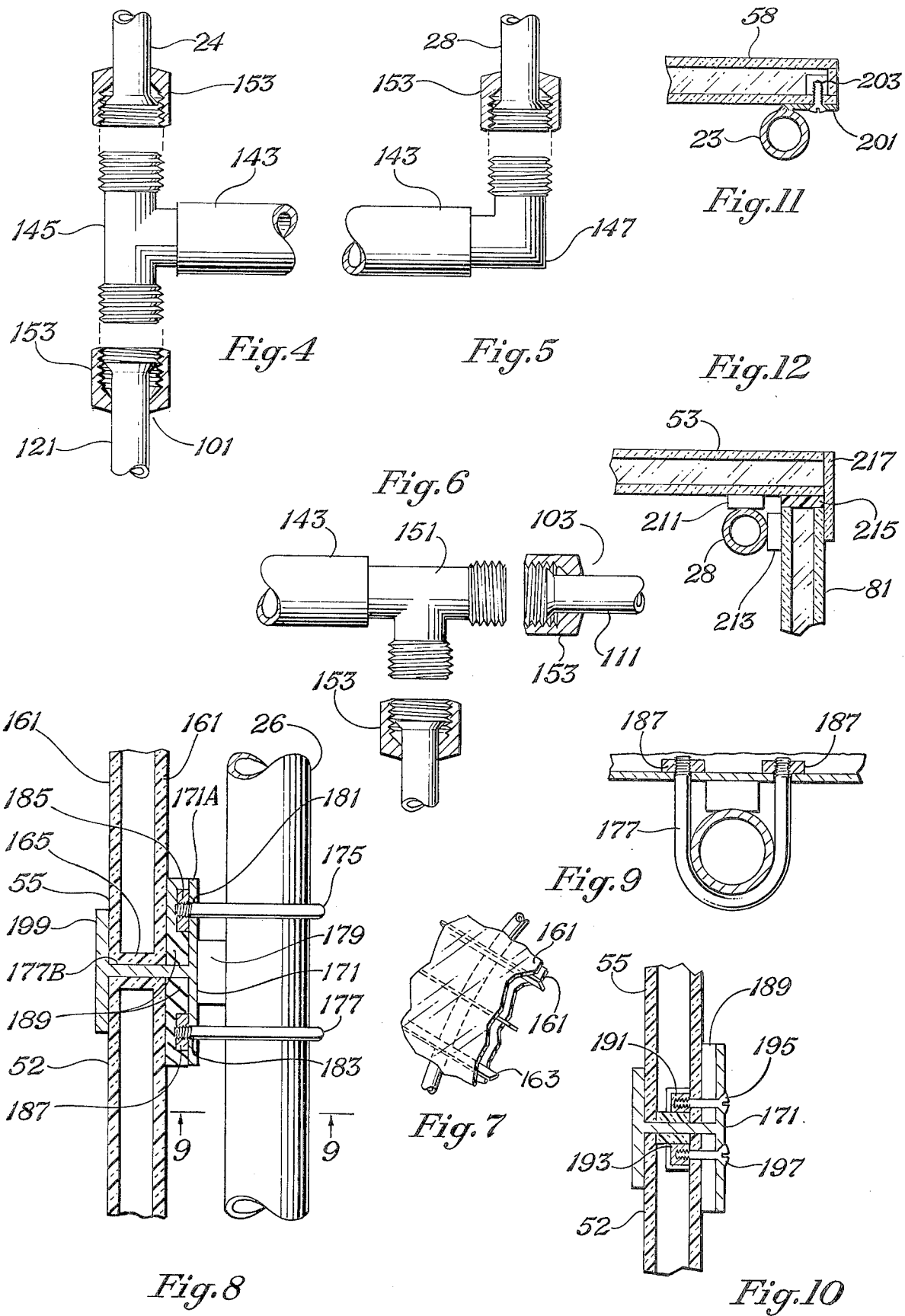

4,018,213

SOLAR HEATING STRUCTURE

BACKGROUND OF THE INVENTION

This invention relates to a housing structure employing solar energy for heating purposes and more particularly to a housing structure employing the suns rays for heating the inside of the housing and water in conduits which form the support structure of the housing.

Conventional greenhouses employ the suns rays for heating the inside thereof during the day and gas, oil, or electrical heaters for heating the greenhouse at night or on rainy or cloudy days. As can be understood, the use of such heaters can contribute significantly to the cost of operating the greenhouse.

SUMMARY OF THE INVENTION

It is an object of the present invention to provide a solar heated housing structure which eliminates or reduces the need of fuel burning or electrical heaters thereby reducing the operating cost.

It is a further object of the present invention to provide a solar heated housing structure which may be used in combination with a conventional home water heater for supplying heated water thereto for reducing the cost of operating the water heater.

The frame of the housing structure of the present invention comprises water carrying conduits which support panels capable of transmitting heat and light from the sun whereby radiant energy from the sun will pass through the panels and heat the space inside the housing structure as well as the water in the conduits. An inlet is formed in the conduits for receiving water to be heated.

In a further aspect, an outlet spaced from the inlet is formed in the conduits which in one embodiment is connected to the inlet of a conventional home water heater.

BRIEF DESCRIPTION OF THE DRAWINGS:

FIGS. 3–6 show the manner in which water conduits are connected together to form the frame of the solar heating structure of FIG. 1;

FIG. 7 is a partial sectional view of one of the transparent panels used for forming the solar heating structure of FIG. 1;

FIG. 8 is a section of the structure of FIG. 1 as seen from the lines 8—8 thereof;

FIG. 9 is a cross-sectional view of a FIG. 8 taken through the lines 9—9 thereof;

FIG. 10 is a cross-sectional view of the structure of FIG. 1 taken through the lines 10—10 thereof;

FIG. 11 is a cross-sectional view of the structure of FIG. 1 taken through the lines 11—11 thereof; and FIG. 12 is a cross-sectional view of the structure of FIG. 1 taken through the lines 12—12 thereof.

DETAILED DESCRIPTION OF THE INVENTION

Figure 1:
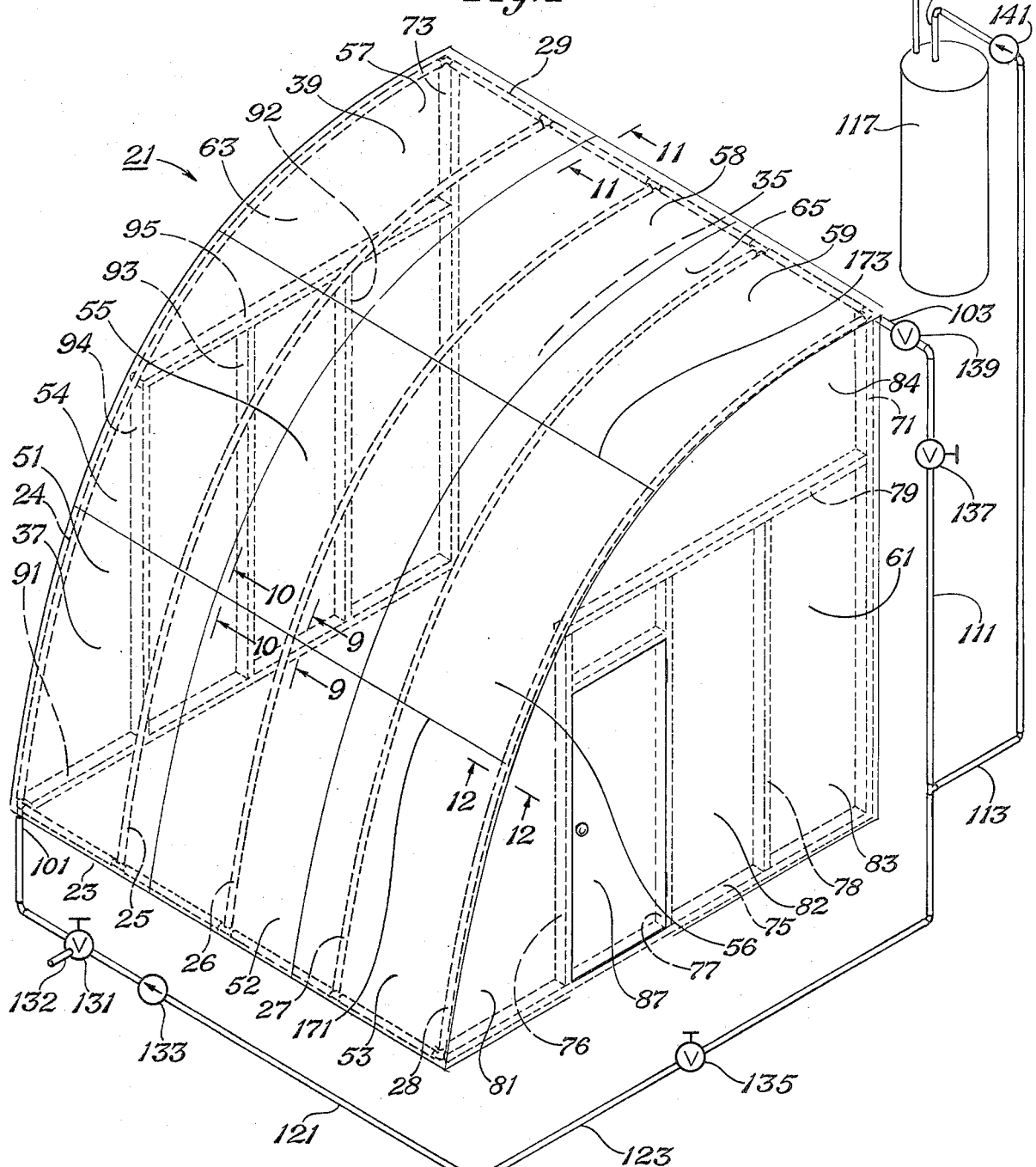
FIG. 1 is a perspective view of one embodiment of the solar heating structure of the present invention.
Figure 2:
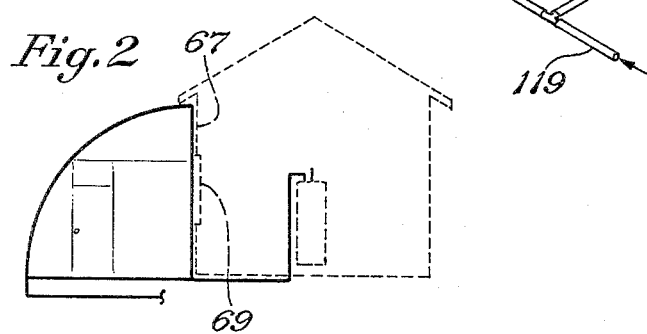
FIG. 2 is a side view of the structure of FIG. 1 backed up against a house shown in dotted form.

Referring now to FIG. 1 reference numeral 21 identifies a greenhouse formed from a plurality of conduits 23–29 attached to each other forming a frame supported on the ground in a position to be exposed to the sun. Conduit 23 rests lengthwise in a horizontal position on the ground while conduit 29 is supported horizontally above and to the side of conduit 23. Conduits 24–28 are curved outward and are connected between conduits 23 and 29 at spaced apart positions. The frame formed by the conduits defines the boundary of a three dimensional space 35 to be heated. The conduits also define the support structure of transparent or translucent panels which are attached to the outward facing sides of the conduits to form a sidewall portion 37 and a top portion 39 of the house. In the embodiment disclosed nine panels 51–59 are supported by the conduits 23–29 to form the sidewall portion 37 and top portion 39. The house also has two flat sidewalls 61 and 63 and an open end 65 whereby the greenhouse may be backed up against and attached to the wall of a home which forms the fourth wall of the greenhouse. In FIG. 2, the wall of the home is identified at 67. It has a window 69 formed therein. The greenhouse is attached to the wall 67 such that the side walls 61 and 63 and the top wall portion 39 encompass the window whereby it may be opened to expose the interior of the home with the interior of the greenhouse.

Conduit 29 is supported by wooden studs 71 and 73 which are attached to the wall 67 of the home. The frame of side wall 61 is formed by stud 71 and wooden members 75–79 and conduit 28. Transparent or translucent panels 81–84 are supported by these members to form the side wall 61. A door 87 also is suported by frame member 77 to allow entrance into the greenhouse. Sidewall 63 is formed by transparent or translucent panels attached to conduit 24, stud 73 and wooden frame members 91–95 although sidewall 63 has no door formed therein. For purposes of clarity the panels forming the sidewall 63 are not shown.

In the preferred embodiment, the conduits 23–29 are formed of copper tubing which is a good conductor of heat. A water inlet 101 is formed in the corner junction of conduits 23 and 24 and a water outlet 103 is formed in the corner junction of conduits 28 and 29. The conduits 23–29 are connected together in a manner such that the passages formed therethrough are in fluid communication with each other and with the inlet 101 and form a plurality of different water flow paths from the inlet 101 to the outlet 103. For example, water flow paths from the inlet to the outlet are by way of conduits 24 and 29. From conduit 23, the flow paths are by way of conduits 25–27 to conduit 29 and then to the outlet. In addition, water may flow from conduit 23 through conduit 28 to the outlet. From the outlet 103, the water may flow by way of a conduit 111 and 113 to the inlet 115 of a conventional home water heater 117.

Water is supplied to the inlet 101 of the greenhouse by way of underground conduits 119 and 121. Another underground conduit 123 extends from conduit 121 to the junction of conduits 111 and 113 for by-pass purposes. A two way valve 131 is coupled to conduit 121 for allowing passage of water from conduit 121 to inlet 101 or for connecting inlet 101 to drain conduit 132. Also coupled to conduit 121 a one way valve 133 which allows water to flow only from conduit 121 to inlet 101. An on-off valve 135 is coupled to conduit 123 and an on-off valve 137 is coupled to conduit 111. Valve 139 is a pressure relief valve while valve 141 is a one way valve which allows water to flow only from conduit 113 to the inlet 115 of the water heater.

When the greenhouse is located to receive energy from the sun, light from the sun is transmitted through the panels to the inside of the greenhouse to the plants located therein. Heat from the sun is transmitted through the panels for directly heating the space therein and hence the plants. In addition, heat is transmitted through the panels to the copper conduits 23-29 inside the greenhouse thereby heating the conduits and hence the water therein. Heat from the sun is thus stored in the water in the conduits and at night the warm water continues to heat the inside of the greenhouse. Thus, the need of fueled or electrically operated heaters for providing heat at night is eliminated or reduced thereby reducing the operating cost of the greenhouse. When using the greenhouse in this manner, valve 137 is closed to retain as much heated water in the conduits as possible. In addition valve 135 will be open to allow water from conduit 119 to by-pass the greenhouse and flow to the water heater 117 by way of conduits 123 and 113. Valve 131 will be positioned to allow flow from conduit 121 to inlet 101. By opening the water valve 137 and closing valve 135, the heated water in the conduits 23-29 may be employed to provide heated water to the water heater 117. The heated water from the greenhouse will over ride the water tank thermostat to cut fuel cost. By backing the open end of the greenhouse around a window of a home, as shown in FIG. 2, heat from the greenhouse may be employed to supplement the output of the home heater thus further reducing cost.

If it is desired to drain the water from the conduits 23-29 valve 137 will be closed and valve 131 positioned to connect inlet 101 with drain conduit 132.

Figure 3:
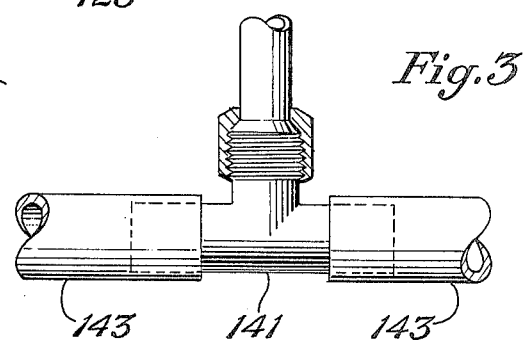

Referring now to FIG. 3, conduits 23 and 29 each are formed by a plurality of T-members 141 sweat soldered to conduits 143. The left end of conduit 23 is formed by T-member 145 sweat soldered to conduit 143 as shown in FIG. 4 while the right end of conduit 23 is formed by a L-member 147 sweat soldered to conduit 143 as shown in FIG. 5. The left end of conduit 29 is formed by a L-member similar to member 147 of FIG. 5 while the right end of conduit 30 is formed by a T-member 151 as shown in FIG. 6.

The ends of conduits 24-28 have slip joint nuts formed thereon for connection purposes. The slip joint nuts are as shown at 153 in FIGS. 3-6. The slip joint nuts are employed to connect conduits 25-27 to the T-members of conduits 23 and 29; to connect conduit 24 to the T-member 145 of conduit 23 and to the L-member of conduit 29; and to connect conduit 28 to the L-member 147 of conduit 23 and to the T-member of conduit 29. A slip joint nut also is formed on conduit 121 to connect the conduit with the T-member 145 which defines the inlet 101. In addition, a slip joint nut is formed on conduit 111 to connect the conduit with the T-member 151 which defines the outlet 103.

Referring to FIG. 7, each panel 51-59 comprises two plates 161 of transparent fiberglass formed to the desired shape and separated and spaced apart by fiberglass ribs or spacers 163 bonded between the plates 161. The ends of the panels are also closed by fiberglass wall members 165 bonded to the edges of the plates 161 as shown in FIG. 8. The panels which form the side walls 61 and 63 are formed in a manner similar to that of panels 51-59 except they are flat rather than curved.

The nine panels 51-59 are connected to and supported by the conduits by way spacers, tabs, and two T-channels. The two T-channels are identified at 171 and 173 in FIG. 1 and are connected across the conduits 24-28 by U-bolts.

Referring to FIG. 8 and 9, channel 171 is shown connected to conduit 26 by U-bolts 175 and 177. A flexible or resilient spacer 179 spaces the channel from the conduit 26. The U-bolts extend around the inside of the conduit 26 and have their free ends fitted through apertures 181 and 183 formed through the channel base 171A. Nuts 185 and 187 are threaded to the free ends of the U-bolts protruding through the apertures. Pads 189 are fitted over the nuts on the outward facing sides of the channel. As shown in FIG. 8, the ends of the panels 52 and 55 rests on the pads and abut against the central perpendicular member 171B of the channel. The upper ends of panels 51 and 53 and the lower ends of panels 54 and 56 are supported in a similar manner to channel 171. In addition, the upper ends of panels 54-56 and the lower ends of panels 57-59 are supported in a similar manner to channel 173.

The inward upper corners of panels 51, 54, 53, and 56; the inward lower corners of panels 54, 57, 56, and 59; the upward corners of panels 52 and 55, and the lower corners of panels 58 and 55 have sealed coupling nuts formed therein for attachment to the channels 171 and 173 by screws. For example, referring to FIG. 10, sealed coupling nuts 191 and 193 are shown formed in the inward lower corner of panel 55 and the inward upper corner of panel 52. Screws 195 and 197 are inserted through apertures formed in the base of channel 171 and through the plates 161 of the panels and threaded into the nuts.

The outward facing lower ends of panels 54-56 and 57-59 have fiberglass slats bonded thereto to overlap their adjoining panels to prevent water from entering the horizontal joints between the panels. One such slat is shown at 199 in FIG. 8, bonded to the lower end of panel 55 and overlapping the upper end of panel 52. The vertical joints may be sealed with suitable sealant.

Outward facing tabs are welded to conduit 29 and downward facing tabs are welded to conduit 23 to allow the upper ends of panels 57-59 to be attached to conduit 29 and the lower ends of panels 51-53 to be attached to conduit 23. One such tab is shown at 201 in FIG. 11. Screws 203 are threaded through the tab and to the sealed nut formed in the panel for attaching the panel 58 to the conduit 29.

The outer edges of panels 53, 56 and 59 and the upper edges of panels 81 and 84 joint each other in the manner shown in FIG. 12. As shown in this figure, the outer edge of panel 53 is spaced from conduit 28 by spacer 211 and extends beyond the conduit. The upper edge of panel 81 is spaced from conduit 29 by spacer 213 and abuts the end of panel 53 with an insulating strip 215 formed therebetween. A fiberglass tab 217 is bonded to the edge of the panel 53 and extends downward overlapping the panel 81. The junction between the outer edges of panels 51, 54 and 57 and the upper edges of the panels which form the flat side wall 61 are formed in a similar manner.

Although not shown, the lower ends of conduits 24 and 28 may be attached to wooden frames 91 and 75 by way of J-bolts having ends threaded into the wooden frames 91 and 75 and curved ends which are fitted around the conduits 24 and 28. In addition, the J-bolt may be attached to the frame 76 and fitted around the conduit 28 at the nearest point between the conduit 28 and the frame 76. J-bolts also are attached to the home and are fitted around the conduit 29.

In order to enhance the heat trapping and retaining ability of the panels, the fiberglass plates and sidewalls forming the panels may be hermetically sealed and air removed therefrom to a pressure lower than that of atmospheric pressure.

In a modified embodiment, the conduit 29 may comprise a large elongated cylindrical tank appropriately supported with the upper ends of conduits 24-28 attached to the upper end of the tank. In addition, a return conduit may be attached to the lower end of the tank and to the conduit 23. The return conduit may follow stud 71 and frame member 75 and be connected to the junction of conduits 23 and conduit 28. The outlet 103 may extend from the center end of the cylindrical tank for connection to the conduit 111.

What is claimed is:

1. Housing structure for employing solar heat for heating an enclosed space, comprising:
   a plurality of conduit members attached to each other forming a frame adapted to be supported on the ground or the like in a position to be exposed to the sun,
   said frame formed by said conduit members defining the boundary of a three dimensional space to be heated,
   said frame formed by said conduit members defining the support structure of at least a side wall portion and a top wall portion,
   the support structure of said side wall position including a plurality of said conduit members which extend in at least two dimensions,
   the support structure of said top wall portion including a plurality of said conduit members which extend in at least two dimensions,
   a water receiving inlet formed in said conduit members,
   a water outlet formed in said conduit members at a position spaced from said inlet,
   said conduit members defining said frame having passages formed therethrough which are in fluid communication with each other and with said inlet and said outlet,
   said conduit members being attached to each other in a manner such that said passages form a plurality of different water flow paths through said conduit members from said inlet to said outlet,
   said conduit members being formed of the material which has good heat conductivity, and
   panel means and supported by said conduit members in a manner to define said side wall portion and said top wall portion,
   said panel means being formed of a material capable of transmitting therethrough heat and light from the sun.

2. The housing structure of claim 1 wherein:
said outlet is connected to the inlet of a conventional water heater.

3. The housing structure of claim 1 wherein:
said inlet is formed in said conduit members at a lower level,
said outlet is formed in said conduit members at an upper level.

4. The housing structure of claim 1 wherein:
said panel means are attached to the outward facing sides of said conduit members such that said conduit members are located on the inside of said housing structure.

5. The housing structure of claim 4 wherein:
said panel means are formed by two spaced walls connected to end walls,
the pressure between said walls of said panel means being less than atmospheric pressure.

6. The housing structure of claim 1 wherein:
said conduit members defining the support structure of said side wall portion includes:
   a lower conduit member which is adapted to be supported lengthwise on the ground or the like, and
   a plurality of conduit members extending upward from said lower conduit member.

7. The housing structure of claim 1 wherein:
said conduit members defining the support structure of said side wall and top wall portions comprise:
   a lower conduit member which is adapted to be supported lengthwise on the ground or the like,
   an upper conduit member located generally horizontally above and to one side of said lower conduit member, and
   a plurality of spaced conduit members extending between said lower and upper conduit members.

8. The housing structure of claim 7 wherein:
said outlet is connected to the inlet of a conventional water heater.

9. The housing structure of claim 7 wherein:
said inlet is formed in said conduit members at a lower level,
said outlet is formed in said conduit members at an upper level.

10. The housing structure of claim 7 wherein:
said panel means are attached to the outward facing sides of said conduit members such that said conduit members are located on the inside of said housing structure.

11. The housing structure of claim 10 wherein:
said panel means are formed by two spaced walls connected to end walls,
the pressure between said walls of said panel means being less than atmospheric pressure.

* * * * *